United States Patent
Giammarresi et al.

(10) Patent No.: US 9,942,124 B2
(45) Date of Patent: Apr. 10, 2018

(54) APPARATUS AND METHODS FOR AUTOMATED DEVICE TESTING IN CONTENT DISTRIBUTION NETWORK

(75) Inventors: Tom Giammarresi, Charlotte, NC (US); Dwight Corley, Huntersville, NC (US); John Gauthier, Indian Trail, NC (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 307 days.

(21) Appl. No.: 13/171,315

(22) Filed: Jun. 28, 2011

(65) Prior Publication Data

US 2013/0007520 A1    Jan. 3, 2013

(51) Int. Cl.
  *G06F 11/22* (2006.01)
  *H04L 12/26* (2006.01)
  *G06F 11/36* (2006.01)
  *H04L 12/24* (2006.01)

(52) U.S. Cl.
  CPC .......... *H04L 43/50* (2013.01); *G06F 11/2294* (2013.01); *G06F 11/3688* (2013.01); *H04L 41/5035* (2013.01)

(58) Field of Classification Search
  USPC .................................................. 714/25, 38.1
  See application file for complete search history.

(56) References Cited

U.S. PATENT DOCUMENTS

| | | | |
|---|---|---|---|
| 5,774,357 A * | 6/1998 | Hoffberg | G06F 3/0482 348/110 |
| 6,195,689 B1 | 2/2001 | Bahlmann | |
| 6,266,810 B1 | 7/2001 | Tanaka et al. | |
| 6,393,585 B1 | 5/2002 | Houha et al. | |
| 6,427,238 B1 | 7/2002 | Goodman et al. | |
| 6,487,723 B1 | 11/2002 | MacInnis | |
| 6,687,735 B1 | 2/2004 | Logston et al. | |
| 6,718,374 B1 | 4/2004 | Del Sordo et al. | |
| 6,813,778 B1 | 11/2004 | Poli et al. | |
| 7,069,578 B1 | 6/2006 | Prus et al. | |
| 7,165,191 B1 * | 1/2007 | Vakrat | 714/38.1 |
| 7,178,143 B2 | 2/2007 | Pugh et al. | |
| 7,216,170 B2 | 5/2007 | Ludwig et al. | |
| 7,234,035 B2 | 6/2007 | Jerding et al. | |
| 7,260,818 B1 | 8/2007 | Iterum et al. | |
| 7,266,726 B1 | 9/2007 | Ladd | |

(Continued)

*Primary Examiner* — Yolanda L Wilson
(74) *Attorney, Agent, or Firm* — Gazdzinski & Associates, PC

(57) ABSTRACT

Methods and apparatus for providing automated testing of network client devices. In one embodiment, test scripts are run at a remote entity which causes changes to functions and/or applications available at the associated client devices. Test scripts may be run as text file framework scripts in a framework run on a script engine. Video capture, optical character recognition (OCR) and image comparison may also be used to determine whether changes to the functions and/or applications run at the devices under test were implemented. The components of the test management and control (TMC) system may be located at separate entities. Several testing entities may access and run tests on the client devices from different remote locations using web services. A reservation service also may be utilized to enable the various testing entities to reserve a date/time for running a test.

22 Claims, 12 Drawing Sheets

(56) References Cited

U.S. PATENT DOCUMENTS

| | | | |
|---|---|---|---|
| 7,296,204 B2 | 11/2007 | Merritt | |
| 7,716,276 B1 | 5/2010 | Ren et al. | |
| 7,716,662 B2 | 5/2010 | Seiden | |
| 8,073,955 B1* | 12/2011 | Gagnon | H04H 60/25 709/203 |
| 2002/0012347 A1 | 1/2002 | Fitzpatrick | |
| 2002/0116706 A1 | 8/2002 | Bahraini | |
| 2003/0028899 A1 | 2/2003 | MacInnis | |
| 2003/0056217 A1 | 3/2003 | Brooks | |
| 2003/0217365 A1 | 11/2003 | Caputo | |
| 2004/0068721 A1 | 4/2004 | O'Neill et al. | |
| 2004/0107415 A1* | 6/2004 | Melamed | G06F 11/3684 717/124 |
| 2004/0148610 A1* | 7/2004 | Tsun | G06F 9/4843 719/316 |
| 2004/0216171 A1 | 10/2004 | Barone et al. | |
| 2005/0114900 A1 | 5/2005 | Ladd | |
| 2005/0144651 A1 | 6/2005 | Prus et al. | |
| 2006/0020950 A1 | 1/2006 | Ladd | |
| 2006/0047957 A1 | 3/2006 | Helms | |
| 2006/0069795 A1* | 3/2006 | Tierney | G06F 11/3688 709/231 |
| 2007/0022459 A1 | 1/2007 | Gaebel | |
| 2007/0076728 A1 | 4/2007 | Rieger et al. | |
| 2007/0150892 A1 | 6/2007 | Chaney | |
| 2007/0204314 A1 | 8/2007 | Hasek et al. | |
| 2007/0217436 A1 | 9/2007 | Markley | |
| 2007/0236613 A1* | 10/2007 | Foss | H04N 5/4403 348/734 |
| 2007/0239841 A1 | 10/2007 | Lehrman | |
| 2007/0283402 A1 | 12/2007 | Yu | |
| 2008/0040767 A1 | 2/2008 | McCarthy | |
| 2008/0072100 A1* | 3/2008 | Okada | 714/28 |
| 2008/0098212 A1 | 4/2008 | Helms | |
| 2008/0109680 A1* | 5/2008 | Kodaka et al. | 714/38 |
| 2008/0294383 A1* | 11/2008 | Parmar | H04L 43/0888 702/186 |
| 2009/0106419 A1* | 4/2009 | Tierney et al. | 709/224 |
| 2009/0254673 A1 | 10/2009 | Philyaw et al. | |
| 2009/0312009 A1* | 12/2009 | Fishel | H01Q 1/241 455/425 |
| 2010/0058409 A1* | 3/2010 | Chapman et al. | 725/106 |
| 2011/0103374 A1 | 5/2011 | Lajoie et al. | |
| 2011/0320879 A1* | 12/2011 | Singh | H04W 24/06 714/38.1 |
| 2012/0278826 A1* | 11/2012 | Jones et al. | 725/14 |

* cited by examiner

APPARATUS AND METHODS FOR AUTOMATED DEVICE TESTING IN CONTENT DISTRIBUTION NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data and content distribution networks. More specifically, the present invention relates in one exemplary aspect to methods and apparatus for automated device testing.

2. Description of Related Technology

The provision of content to a plurality of subscribers in a content-based network is well known in the prior art. In a typical configuration, the content is distributed to the subscribers devices over any number of different topologies, including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Before certain functionality may be implemented across consumer devices in a network, one or more software applications for implementing the functionality must be tested. For example, applications which enable a user to: order a movie (PPV or OD), "surf" the guide channel or electronic program guide (EPG), record a program, set or use closed captioning features, set or implement parental controls, etc., along with additional applications for features not yet implemented, each require extensive testing in a laboratory environment. Additionally, testing (in a laboratory environment) is performed routinely to ensure currently implementing functions continue to run properly, and/or to test upgrades to existing software implementations.

Exemplary prior art testing methods include e.g., the MiriATE® Test Automation system by Solekai Systems Corporation, and the StounTest™ Development Center by S3 Group Incorporated. However, these prior art testing methods are generally segmented (i.e., performed as a series of physically and temporally separate steps) and performed manually. For instance, in a case where a channel is to be added to a line-up, a series of tests must be performed including: (i) verifying that the channel is not present on a particular client device, (ii) manually adding the channel to a server, (iii) verifying that the channel was added. The verification steps involve using a remote control device or other means for manipulating a display or otherwise navigating via the user interface to check for (i.e., verify) the changes. Such methods are often tedious, require a large number of man-hours, and must be performed individually on a number of test devices.

Accordingly, what are needed are apparatus and methods for replacing the time consuming manual testing process of the prior art, so as to provide inter alia automated end-to-end testing. Ideally, such apparatus and methods would be configured to provide testing to be performed remote to the physical location of the devices under test. Additionally, the automated process would enable simplified testing processes that do not require innate coding skills.

SUMMARY OF THE INVENTION

The present invention addresses the foregoing needs by providing methods and apparatus for providing automated testing of devices in a content distribution network.

In a first aspect of the invention, a system for enabling testing of a plurality of client devices is disclosed. In one embodiment the client devices are for use in a content delivery network, and the system includes: a first entity comprising at least a user interface for enabling a user to develop and implement one or more test scripts for changing at least one aspect of a function present on the plurality of client devices; a second entity comprising at least a processor for executing the one or more test scripts to run on the plurality of client devices; a validation entity comprising at least video capture, optical character recognition, and image comparison capabilities and configured to enable the user to determine whether the changes to the at least one aspect were implemented.

In one variant, the first entity comprises a user's personal computer, and the user interface comprises a web browser.

In a second aspect of the invention, an apparatus for running one or more scripts for testing a plurality of client devices is disclosed. In one embodiment, the client devices are adapted for use in a content delivery network, and the apparatus includes: at least one interface for communicating with a plurality of test devices operated by individual ones of a plurality of users; a reservation service; at least one server in communication with the plurality of client devices; a storage element configured to store a plurality test scripts thereon, the test scripts being developed by users of the plurality of test devices, the test scripts configured to evaluate at least one aspect of a function of the plurality of client devices; and a processor, the processor being configured to cause the test scripts to be executed on one or more of the plurality of client devices. Communication with the reservation service comprises receipt of one or more commands relating to one or more of the plurality of client devices on which to run the particular ones of the one or more test scripts.

In a third aspect of the invention, an apparatus for facilitating testing of a plurality of client devices associated with a content delivery network is disclosed. In one embodiment, the testing is performed via a plurality of distributed testing devices, and the apparatus includes: at least one interface for communicating with the plurality of distributed test devices; an engine for storing and running a plurality of test scripts; at least one server in communication with the plurality of client devices; a storage element configured to store a plurality of information relating to reserved dates and times for each of the plurality of client devices, the reserved dates and times indicating particular ones of the plurality of test scripts to be thereon at the reserved dates and times; and a processor, the processor being configured to enable individual ones of the testing devices to reserve dates and times for testing of particular ones of the plurality of client devices. Testing of the client devices comprises the particular ones of the plurality of test scripts being executed thereon at the reserved dates and times.

In a fourth aspect of the invention, a method for enabling testing of a plurality of client devices is disclosed. In one embodiment, the devices are adapted for use in a content delivery network, and the testing uses one or more test scripts for evaluating at least one aspect of a function present thereon. The method includes executing the one or more test scripts to run on the plurality of client devices; collecting a plurality of information relating to the at least one aspect of the function from the plurality of client devices; and determining based at least in part on the collected information whether one or more changes to the at least one aspect have been implemented at the plurality of client devices.

In one variant, the plurality of client devices are disposed at respective ones of content delivery network user premises. In another variant the devices are disposed in one or more test facilities.

In a fifth aspect of the invention, a computer readable apparatus is disclosed. In one embodiment, the apparatus comprises a storage medium having a plurality of test scripts disposed thereon, the test scripts being useful for testing of a plurality of client devices in a substantially simultaneous manner.

Other features and advantages of the present invention will immediately be recognized by persons of ordinary skill in the art with reference to the attached drawings and detailed description of exemplary embodiments as given below.

Figure 1:
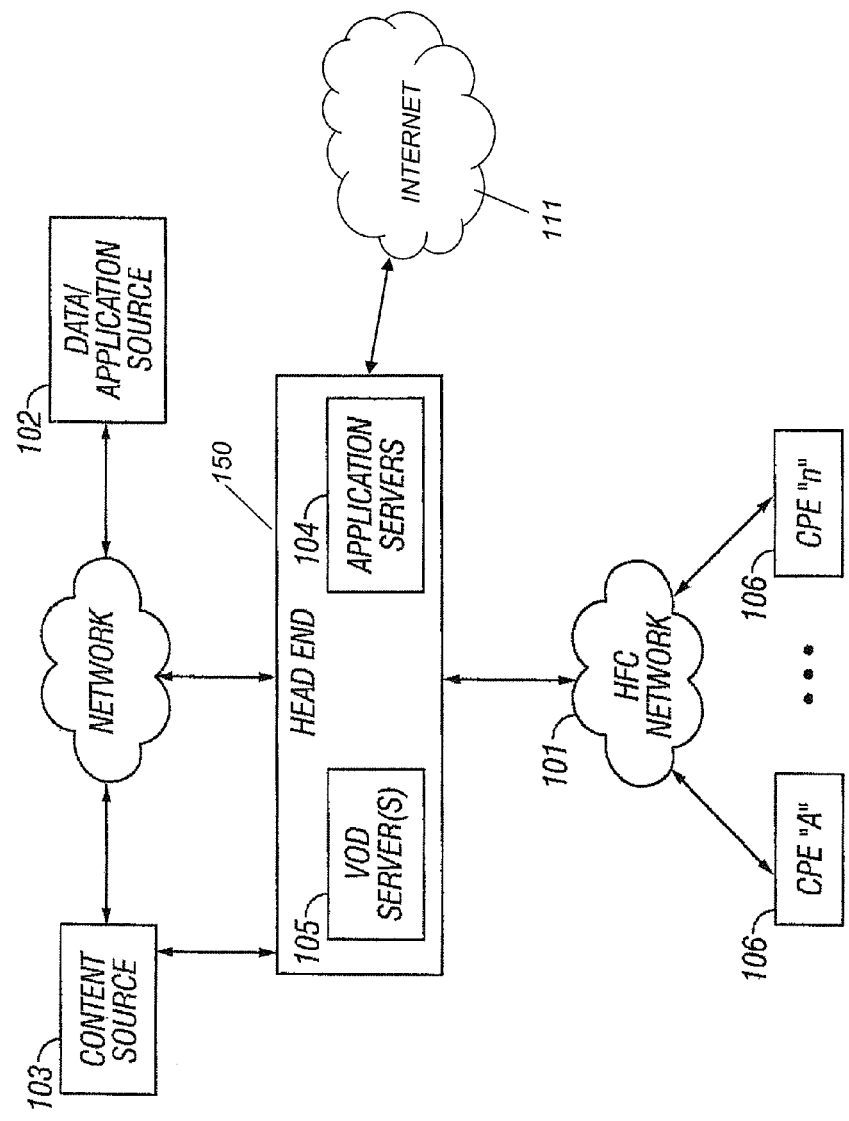
FIG. 1 is a functional block diagram illustrating an exemplary hybrid fiber network configuration useful with the present invention.

All Figures © Copyright 2011 Time Warner Cable, Inc. All rights reserved.

DETAILED DESCRIPTION OF THE INVENTION

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, personal computers (PCs), and mini-computers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, MPEG-4 Part 2, MPEG-4 Part 10, etc.), Real (RealVideo, etc.), AC-3 (audio), DiVX, XViD/ViDX, Windows Media Video (e.g., WMV 7, 8, or 9), ATI Video codec, H.263, H.264, Sorenson Spark, FFmpeg, 3ivx, x264, VP6, VP6-E, VP6-S, VP7, Sorenson 3, Theora, Cinepack, Huffyuv, Lagarith, SheerVideo, Mobiclip or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment"

(CPE) includes such electronic equipment such as set-top boxes, televisions, Digital Video Recorders (DVR), gateway storage devices (Furnace), and ITV Personal Computers, as well as client devices.

As used herein, the term "display" means any type of device adapted to display information, including without limitation: CRTs, LCDs, TFTs, plasma displays, LEDs, incandescent and fluorescent devices. Display devices may also include less dynamic rendering devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. Multiple regional headends may be in the same or different cities.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, fiber networks (e.g., FTTH, Fiber-to-the-curb or FTTC, etc.), satellite networks, telco networks, and data networks (including MANs, WANs, LANs, WLANs, internets, and intranets).

As used herein, the term "network interface" refers to any signal, data, or software interface with a component, network or process including, without limitation, those of the Firewire (e.g., FW400, FW800, etc.), USB (e.g., USB 2.0 or 3.0), Ethernet (e.g., 10/100, 10/100/1000 (Gigabit Ethernet), 10-Gig-E, etc.), Thunderbolt, MoCA, Serial ATA (e.g., SATA, e-SATA, SATAII), Ultra-ATA/DMA, Coaxsys (e.g., TVnet™), radio frequency tuner (e.g., in-band or out-of band, cable modem, etc.), Wi-Fi (e.g., 802.11a,b,g,n,v), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the twin "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

Overview

In one salient aspect, the present invention discloses methods and apparatus for providing automated end-to-end testing of a plurality of client devices. In one embodiment, a laboratory environment is provided having a plurality of client devices for simulating premises devices; i.e., receiving programming in much the same manner as actual premises client devices within the network. A test script is run at a separate (often remote) entity which causes changes to functions, applications, and/or programs available at the devices.

In much the same way a remote control device operates to navigate the user interfaces provided (such as via an EPG) in a user's home, an infrared (IR) or RF device controlled by a network operator is provided for navigating the user interfaces (e.g., EPG). Using the IR/RF device, a network operator can distinguish whether the script was successful in causing changes to the functions, applications and/or programs available at the devices.

In another embodiment, the test scripts are run as text file framework scripts within a framework run on a tester device.

In this manner, a person who is not necessarily skilled at writing code or scripts can use text files to generate test scripts easily. In one variant, a Domain specific language (DSL) implemented in the Ruby scripting language may be utilized.

In yet another embodiment, video capture, optical character recognition (OCR) and image comparison may be utilized to assist in determining whether a script was successful in causing changes to the functions, applications and/or programs run at the devices under test.

Various ones of the aforementioned components of the test management and control (TMC) system may be physically separated onto one or more separate entities in communication with each other. Accordingly, the system may be distributed across multiple distinct or remote locations. For instance, a test generator may generate a test script at a first location, cause the test to be run at devices at a second location, and image capture for verification of the tested functions or applications may occur at a third location.

Several testing entities may therefore advantageously access and run tests on the plurality of client devices from remote locations. In one variant, this is accomplished by enabling the various testing entities to deposit applications for testing and/or test scripts at an application server and/or script engine. The testing entities can access these (to begin testing) using a web browser, the aforementioned entities using web services as well.

Likewise, a reservation service may be utilized to enable the various testing entities to reserve a date/time for running a test at the plurality of devices. As the system expands and additional testing entities are utilized, the reservation service ensures that each of the testing entities receives a reserved date/time for running tests, and also maintains consistency across the various different entities and test regimes. Additionally, a large number of tests may be queued to run sequentially on a plurality of devices.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while exemplary embodiments are described primarily in the context of a cable system with 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC or HFCu or satellite) network 101. The headend 150 is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention.

The data/application origination point 102 comprises any medium that allows data and/or applications (such as a VOD-based, EPG or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. The CPE may include IP-enabled CPE 107 (although not illustrated in FIG. 1), and/or a gateway device having a specially configured modem (e.g., DOCSIS cable modem).

Although not illustrated, a typical network headend 150 may further include e.g., various billing entities, subscriber management systems, a cable modem termination system (CMTS), and/or out of band (OOB) systems. Additionally, the headend 150 may incorporate a multiplexer-encrypter-modulator (MEM) adapted to process or condition content for transmission over the network. As previously described, information is carried across multiple channels. Thus, the headend 150 must be adapted to acquire the information for the carried channels from various sources. Typically, the channels being delivered from the headend 150 to the CPE 106 ("downstream") are multiplexed together in the headend, as previously described (via the MEM) and sent to a neighborhood hubs which provides content to one or more CPE 106 in a "service group". To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be appreciated that the network configuration depicted in FIG. 1 is high-level, conceptual architecture and that each MSO may have multiple headends deployed using custom architectures.

"Switched" Networks—

Although not illustrated, a "switched" network (a so-called "broadcast switched architecture" (BSA), also known as "switched digital video" or "SDV" architecture) may also be used consistent with the present invention. Switching architectures allow improved efficiency of bandwidth use for ordinary digital broadcast programs. Ideally, the subscriber is unaware of any difference between programs delivered using a switched network and ordinary streaming broadcast delivery.

In one exemplary embodiment, the headend 150 contains switched broadcast control and media path functions which cooperate to control and feed, respectively, downstream or edge switching devices at the hub site (which are used to selectively switch broadcast streams to various service groups). A BSA or SDV server may also be disposed at the hub site to implement functions related to switching and bandwidth conservation (in conjunction with a management entity disposed at the headend 150). An optical transport ring can be utilized to distribute the dense wave-division multiplexed (DWDM) optical signals to each hub in an efficient fashion.

U.S. patent application Ser. No. 09/956,688 entitled "TECHNIQUE FOR EFFECTIVELY PROVIDING PROGRAM MATERIAL IN A CABLE TELEVISION SYSTEM" (published as U.S. Patent Publication No. 2003/0056217) describes one exemplary broadcast switched digital architecture useful with the present invention, although it will be recognized by those of ordinary skill that other approaches and architectures may be substituted.

"Packetized" Networks—

In addition to on-demand and broadcast content (e.g., video programming), the system of FIG. 1 also delivers Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

The CPE 106 are each configured to monitor the particular assigned RF channel (such as via a port or socket ID/address, or other such mechanism) for IP packets intended for the subscriber premises/address that they serve.

In another embodiment of the present invention, a "packet optimized" delivery network is used for carriage of the packet content (e.g., IPTV content) when the request issues from an MSO network, as described in co-pending U.S. patent Ser. No. 12/764,746 entitled "METHODS AND APPARATUS FOR PACKETIZED CONTENT DELIVERY OVER A CONTENT DELIVERY NETWORK" and filed on Apr. 21, 2010 (which claims priority to U.S. Provisional Patent Application Ser. No. 61/256,903), incorporated herein by reference in its entirety. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

Automated Device Testing Network Architectures—

Figure 2:
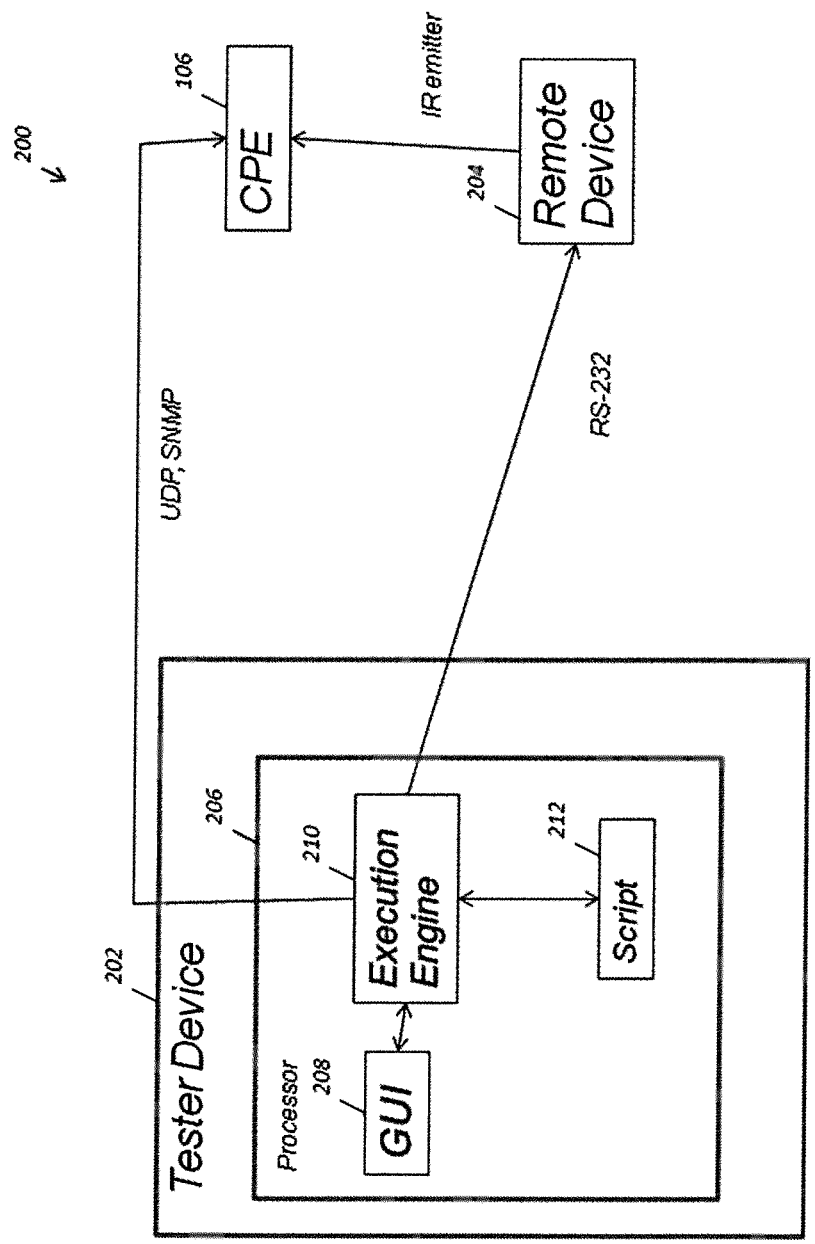
FIG. 2 is a functional block diagram illustrating a first embodiment of an exemplary automated device testing system for use with the present invention.

Referring now to FIG. 2, a first embodiment of a network architecture 200 for providing automated device testing in accordance with the present invention is described. As shown, the architecture 200 generally comprises a testing device 202, and an remote (e.g., infrared (IR) or radio frequency (RF)) device 204 in communication with a plurality of CPE 106 for testing thereof. As used in this context, the term "remote" does not connote any specific location or relationship between the devices (e.g., does not require the devices to be physically remote).

As shown, the processor 206 of the testing device 202 is configured to run an execution engine 210 thereon. The execution engine 210 implements one or more scripts 212 for controlling the CPE 106. The stored scripts 212 provide a plurality of commands for updating and testing CPE 106.

The scripts 212 are developed for the specific purpose of testing one or more aspects of the functionality of the CPE 106. For instance, scripts 212 may be provided to validate movie ordering functionality, electronic program guide (EPG) functionality, channel surfing functionality, program recording functionality, close captioning functionality, parental control functionality, an ability for the headend to add, remove and/or modify channels, and other program modifications and/or interactivity whether occurring at the CPE 106 or headend (or local node).

In one exemplary embodiment, the testing device 202 comprises a personal or laptop computer capable of running the execution engine 210 and storing one or more scripts 212 for execution thereon. In one variant, the execution engine 210 runs in Java™ with the scripts written in BeanShell, although other software languages and environments may be used with equal success.

Each script 212, when executed using the execution engine 210, causes one or more commands to be transmitted to the remote device 204. In one embodiment, communication between the testing device 202 and remote device 204 occurs via a Recommended Standard 232 (RS-232) connection of the type well known in the data communication arts, although any number of other interfaces, whether wired (e.g., USB, IEEE Std. 1394, Thunderbolt, etc.) or wireless (e.g., WLAN, Bluetooth/PAN, etc.) may be used as well. The remote device 204 simulates a remote control. In other words, the remote device 204 acts as a computer-controlled remote control device to the CPE 106 being controlled according to the enacted scripts 212 from the testing device 202.

The commands received at the remote device 204 are used to control the operation of one or more CPE 106 so as to navigate the various on-screen displays and interfaces. However, it is appreciated that the remote device 204 may be omitted in favor of direct communication between the testing device 202 and the CPE 106 using e.g., User Datagram Protocol (UDP) or other suitable mechanism. However, in a preferred embodiment, the remote device 204 is utilized in order to more closely recreate the user experience (i.e., the user's interaction with programming, EPG, etc. using a remote control at the user's premises), including any latencies associated therewith as compared to a hard-wired device.

The remote device 204 emits a signal (e.g., RF or IR) which causes action to be taken on the one or more CPE 106 in communication therewith according to the script 212 execution. In one embodiment, the remote device 204 has four ports, thus enabling communication with up to four CPE 106. In this manner, a single script may be executed across at least four CPE 106 simultaneously. Remote devices 204 having fewer or more ports may also be utilized, thereby providing communication to more or fewer CPE 106 simultaneously. Alternatively (or in addition), one or more IR "blaster" devices may be utilized to control the CPE 106. An IR blaster s a device that emulates an infrared remote control to autonomously control a device that is normally controlled only by remote control key presses. The IR blaster allows a device (such as a DVR, STB, DSTB, etc.) to change the channel of a tuner of the device (or a device in communication therewith). The IR blaster may also extend a reach of infrared signals.

The processor 206 of the tester device is further configured to provide a graphic user interface (GUI) 208 for display to and interaction with the user or operator of the tester device 202. The GUI 208 provides a mechanism for, inter alia, the operator to select a script for execution. For instance, if the operator would like to run a test for determining whether a recently added channel may be tuned to by the CPE 106, the operator can select the appropriate script for such testing via a listing on the GUI 208. Additionally, the operator may use the GUI 208 to select/de-select individual ones of the CPE 106 for testing, instantiate a series of tests, review test results and validations, etc.

In response to the control messages provided to the CPE 106 from the tester device 202 (via the remote device 204), response data is received at the tester device 202. The response data may be transmitted using e.g., Simple Network Management Protocol (SNMP), or other suitable mechanism. As is well known in the art, SNMP may be used to expose certain data on the managed devices, which describe the system configuration (i.e., memory remaining, channel currently tuned to, etc.). This data can then be queried by the testing device 202 to validate certain functionality.

For instance, the script 212 may be utilized to validate that the CPE 106 have an ability to record a particular program. The script 212, therefore, causes the remote device 204 to access the EPG for each CPE 106, select the appropriate program, and record it (or at least issue the appropriate command or signal to the recording device). Using SNMP, the tester device 202 may in one such variant then query the CPE 106 to determine remaining memory, which when compared to a previous memory reading, will indicate whether the selected program was recorded.

Figure 3:
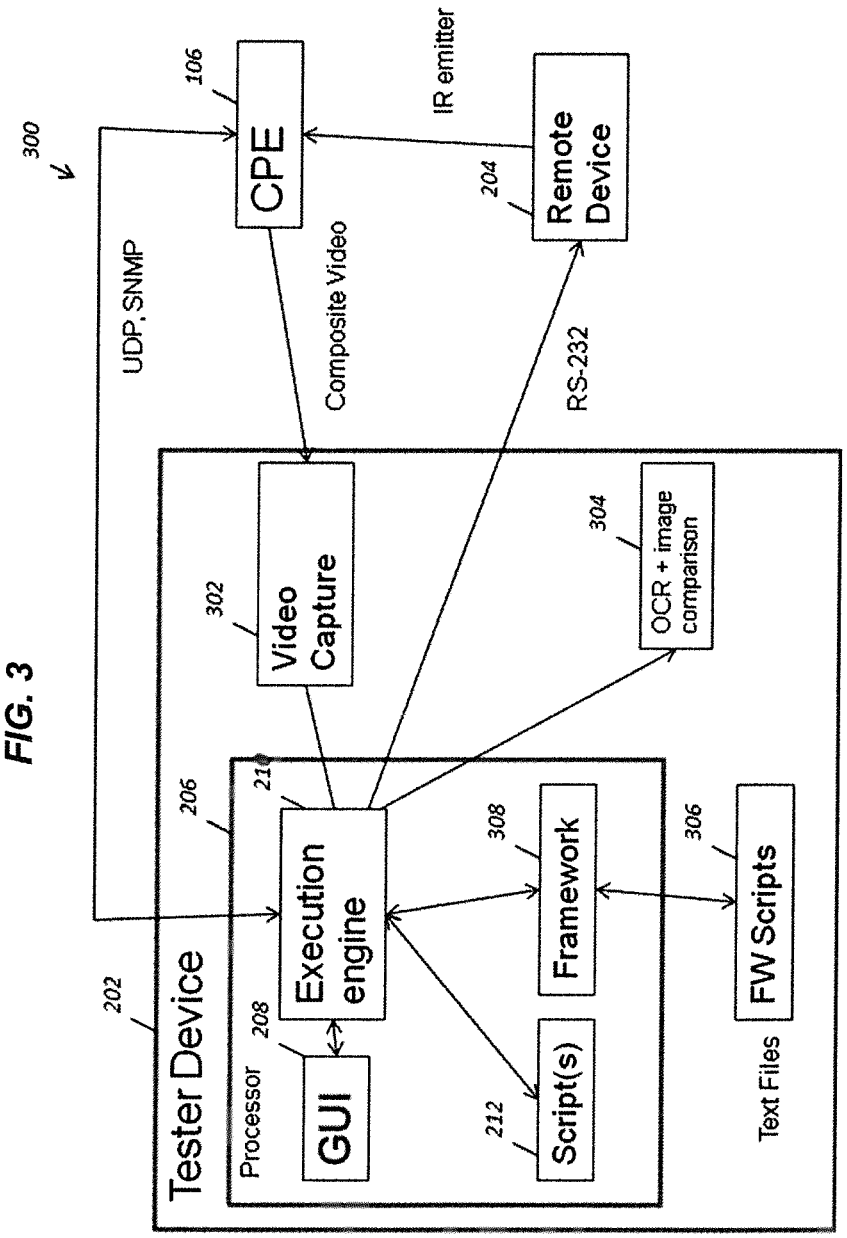
FIG. 3 is a functional block diagram illustrating a second embodiment of an exemplary automated device testing system for use with the present invention.

FIG. 3 illustrates another embodiment of a network architecture 300 for providing automated device testing in accordance with the present invention. As illustrated, the architecture 300 generally comprises a tester device 202 and remote device 204 in communication with a plurality of CPE 106. As discussed above with respect to FIG. 2, the remote device 204 is utilized to control the CPE 106 via IR signaling based on commands received from the execution engine 210 (or RF signaling, etc.). In the illustrated embodiment of FIG. 3, the remote device 204 communicates with the tester device 202 via an Ethernet connection thereto. However, other communications may be utilized with equal success.

The embodiment of FIG. 3 advantageously includes a plurality of additional features and capabilities which may be disposed on one or more unique processors (not shown) of the tester device 202, or which may be run on the processor 206 thereof. For instance, video capture capability 302 and optical character recognition (OCR) with image comparison 304 capabilities may be provided at the tester device 202.

Specifically, in one exemplary embodiment, the video capture capability 302 enables the tester device 202 to receive a composite or other video signal from the CPE 106 under test in order to validate the CPE's proper function. For example, the execution engine 210 may, via one or more scripts 212, cause the CPE 106 to e.g., implement a parental control. In order to validate that the parental control was implemented, the remote device 204 is used to cause the CPE 106 to tune to a program or channel which would be blocked by the parental control. Upon tuning, the video signal is sent back to the video capture apparatus 302 at the tester device 202 to validate that the program or channel is indeed blocked (i.e., a blocked message is being displayed at the CPE 106, as opposed to the requested programming content or channel). In one exemplary embodiment, a 16-port video capture device is utilized. Accordingly, the video capture device 302 may receive up to 16 separate video streams at one time (which may be originated from one or multiple CPE).

In one variant, an API such as the DirectShow multimedia framework may be utilized to provide a common interface for media across the programming languages of the CPE 106 and tester device 202. A DirectShow Java Wrapper (Java abstraction layer) may also further be utilized to facilitate the use of the DirectShow framework.

The OCR and image comparison capability 304 enables the tester device to verify images and text which appear for display at the CPE 106. For instance, the execution engine 210 may, via one or more scripts 212, cause the CPE 106 to e.g., add a new channel to its channel lineup (as listed in an EPG). In order to validate that the new channel was in fact added, the remote device 204 is used to cause the CPE 106 to display the EPG. The OCR and image comparison device 304 receives an SNMP data message, the composite video signal, or other communication. The OCR and image comparison device 304 uses the message to determine whether the new channel was added, such as by recognizing text within the EPG, and/or comparing the EPG image to an image of an EPG having the new channel added.

In another variant, the OCR and image comparison apparatus 304 utilizes Microsoft® .NET framework. As noted above, the execution engine 210 in one embodiment runs Java. Thus, a Java to .NET bridge (JNBridge) may be needed for communication between the execution engine 210 and OCR and image comparison apparatus 304.

As discussed above with respect to the embodiment of FIG. 2, the scripts 212 may generally be run in Java. However, it is appreciated that in the embodiment of FIG. 3, rather than requiring all scripts to be written in the Java scripting language BeanShell, framework scripts may be written as text files 306. In one embodiment, a DSL (Domain Specific Language) implemented with the Ruby language is utilized. A framework 308 running on the tester device processor 206 enables the text scripts 306 to be translated into a language executable by the execution engine 210. In this manner, operators of the tester device 202 do not need to have advanced knowledge of scripting or scripting languages in order to develop and run tests using the tester device 202.

Further, in addition to the ability of the tester device 202 to use the same script to test several CPE 106 simultaneously (i.e., in parallel), the embodiment of FIG. 3 also provides an ability of the tester or operator to instantiate a single test script on the plurality of CPE 106 serially; i.e., one at a time, the next CPE 106 not being tested until the first CPE 106 testing is completed. In order to provide the ability to test in parallel and/or serially, the tester device 202 spawns one (in the case of serial testing) or more (in the case of parallel testing) shells (e.g. Beanshells). In a further embodiment, the scripts themselves may be configured to cause serial and or/parallel testing. In other words, the commands in the script may indicate that a test is to be performed on all devices, or on only one device, and how many times the test is run. Alternatively, the tester device 202 may be configured to comprise multiple execution engines 210, each engine may therefore run the same or a different script for testing the multiple CPE 106.

Figure 4:
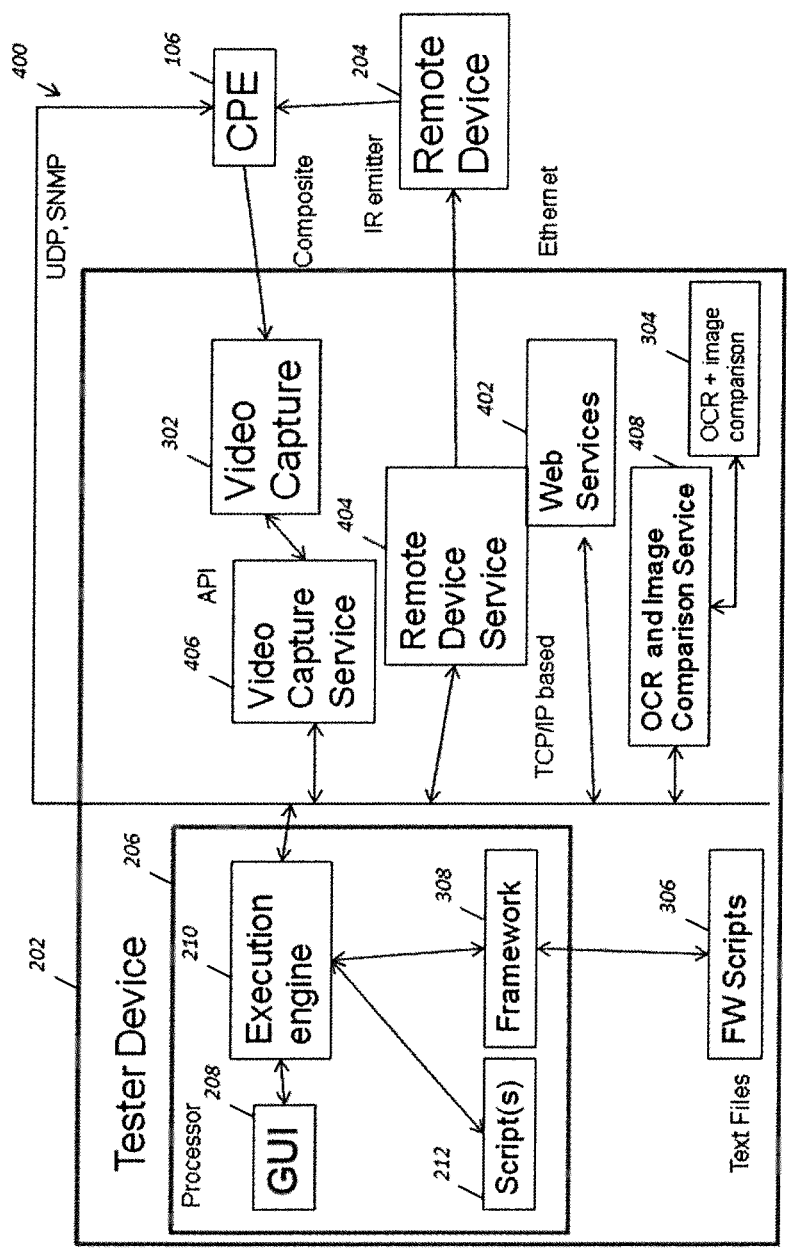
FIG. 4 is a functional block diagram illustrating a third embodiment of an exemplary automated device testing system for use with the present invention.

Referring now to FIG. 4 a further embodiment of the testing architecture is illustrated. As shown, the architecture comprises a tester device 202 which is configured to control a plurality of CPE 106 using a remote device 204. As discussed above with respect to FIG. 3, the tester device of the embodiment of FIG. 4 incorporates a framework 308 which enables text file scripts 306 to be utilized at the execution engine 210, thereby obviating the need for Java-based scripting.

Additionally, the embodiment of FIG. 4 incorporates a video capture apparatus 302 and OCR and image comparison entity 304. The video capture apparatus 302 and OCR and image comparison entity 304 of the embodiment of FIG. 4 have generally the same functionality as discussed above. However, in the embodiment of FIG. 4, each of these is further assigned a respective "service" entity (video capture service 406 and OCR and image comparison service 408). Providing the functionalities (e.g. OCR, image comparison, etc.) as web services allows the functionality to be made available over the web to any language that can communicate to a web service. One main benefit of this approach is that it allows the architecture to be flexible; i.e. scripts can be written in many different languages, and can reside anywhere (i.e., on the same computer or a different computer). The services 406, 408 run in their own memory space and/or on different computers, thereby making the overall testing run more smoothly by, inter alia, avoiding processing bottlenecks. Additionally, providing these services as intermediaries between the execution engine and the video capture device 302 and OCR and image comparison entity 304, respectively, enables the execution engine to be logically (and in some cases physically) separate from these entities 302, 304.

In the previously described embodiments, TMC was implemented as one large application, and the parts written in Java and .NET, therefore communicated using JN Bridge as well as files written to disk. With the current implementation, the application is more loosely coupled and communicates using web services, hence a JN bridge is not illustrated in the embodiment of FIG. 4.

Furthermore, a remote device service 404 is also utilized. The remote device service 404 interacts directly with the remote device 204. As discussed above with respect to the video capture service 406 and OCR and image comparison service 408, by providing an intermediary for communication between the remote device 204 and the execution engine 210, the execution engine 210 may be moved to an architecturally solitary portion of the processor 206 or in a distinct device from the remote device service 404 altogether. In one embodiment, the remote device 204 of FIG. 4 has 16 independent transmitters thus solving contention issues with the previously discussed 4-port remote device 204 which has 1 transmitter shared between the 4 ports in one embodiment.

As illustrated in FIG. 4, Transport Control Protocol (TCP)/Internet Protocol (IP) based Web Services 402 may also be utilized in the present embodiment. The Web Services 402 provide a software system designed to support interoperable machine-to-machine interaction over a network. In the context of the present invention, Web Services 402 provide a means for obtaining information needed for a script. The web server provides the communication over the web. Hence, each service (e.g. OCR) is a web service, and provides both the function of responding to web requests, as well as performing the service (e.g. OCR). Additionally, the use of Web Services 402 enables a tester or network operator to control all testing via a web interface, thereby enabling mobility of the system. In other words, the Web Services 402 provides an ability of a network operator to access and begin running scripts. This may include, for example, accessing the GUI 208 via Web Services 402 over the Internet. In this manner, a tester/operator may be physically located at a separate location from the tester device, and yet control testing of CPE 106 located at a third location.

As is illustrated, the segregation or architectural separation of the components of the embodiment of FIG. 4 enables the system to be physically and logically distributable. Hence, the different components may be run in different devices, at different locations, or within the same device on a separate memory and/or using a separate processor. The tester device 202 may likewise control CPE 106 on different racks, as will be discussed in greater detail below.

In one variant, HP® QuickTest Professional (QTP) software is run at the execution engine 210 to provide functional and regression test automation. QTP supports scripting interfaces via the graphical user interface and uses Visual Basic Scripting (VBScript) language to specify a test procedure, and to manipulate the objects and controls of the application under test. Hence, QTP may be used to launch remote (e.g., IR) services 404 and run tests on the CPE 106.

In yet another variant, IBM® Rational Functional Tester (RFT) software is run at the execution engine 210 for providing test automation. RFT uses Java and VB.NET as its scripting languages. In a manner similar to that discussed above with respect to QTP, RFT is used to manipulate objects and controls of an application under test therefore launches remote device services 404 to run tests on the CPE 106. RFT and QTP perform similar functions, hence either may be used with equal success. The foregoing system is advantageously flexible in this regard, and may work with either.

Figure 5:
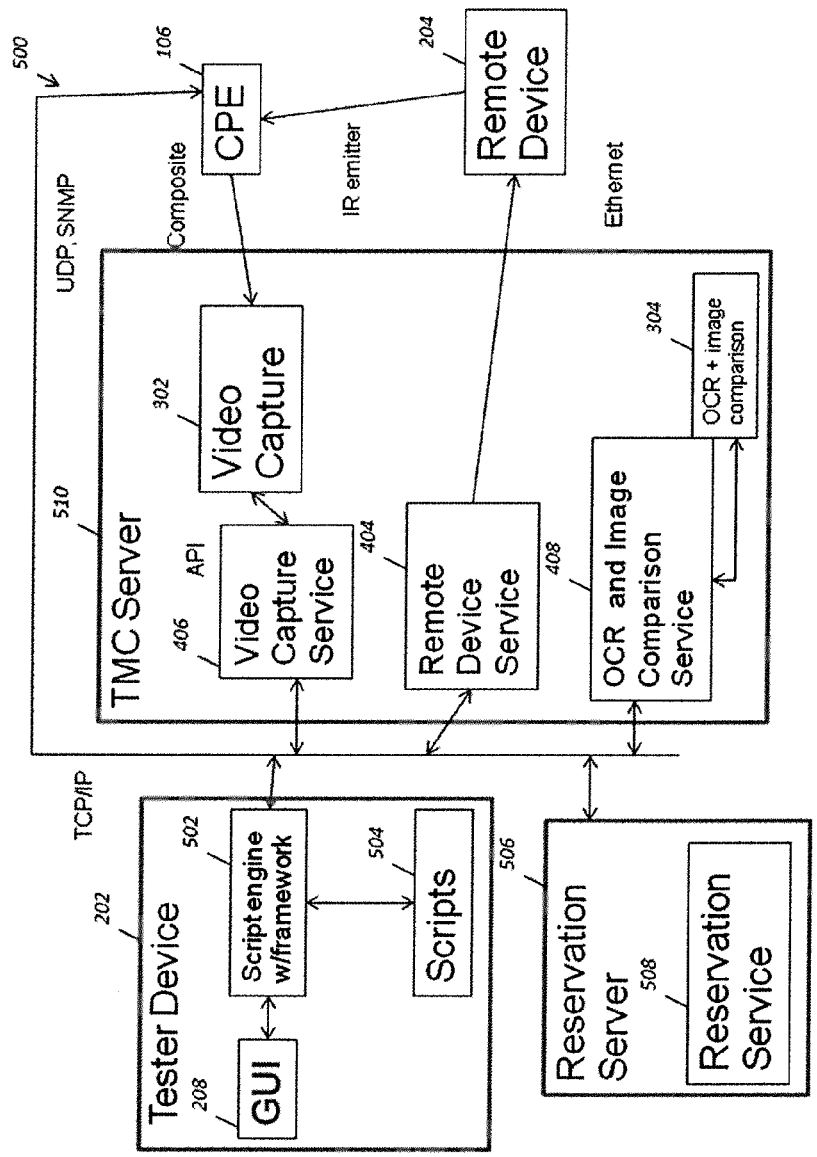
FIG. 5 is a functional block diagram illustrating a fourth embodiment of an exemplary automated device testing system for use with the present invention.

Referring now to FIG. 5, a further embodiment of the testing architecture is illustrated. The test device 202 of this embodiment is configured to be "thinner" (i.e., in terms of hardware and software) than that of the previous embodiments (FIGS. 2-4). In particular, the testing device 202 merely comprises a GUI 208, a script engine with framework 502 and a plurality of scripts 504.

The GUI 208 in this embodiment is similar to that discussed above with respect to FIGS. 2-4. In particular, the GUI 208 enables a tester or network operator to manage the script engine 502. In the particular embodiment of FIG. 5, however, the script engine 502 is configured to perform the functions of an execution engine 210 (such as that discussed above with respect to FIGS. 2-4) and a framework 308. Specifically, the script engine 502 comprises a single entity adapted to execute one or more scripts either simultaneously or sequentially. The script engine is also configured to run scripts which are not in a standardized format (i.e., text files) via its framework capabilities. Thus, the scripts 504 run at the script engine 502 of FIG. 5 may, in an exemplary embodiment, comprise both Java-based scripts (as discussed above with respect to FIG. 2, element 212) as well as non-programmer entered text file scripts (as discussed above with respect to FIG. 3, element 306). It is further appreciated that the script engine 502 may be adapted to enable concurrency so that individual scripts can be started and stopped without affecting the other concurrently running scripts.

Java based scripts can be written in a Java IDE (e.g. Eclipse), and the debugging is provided by the IDE.

In the architecture of FIG. 5, the tester device 202 is in communication with a reservation server 506 and a test measurement and control (TMC) server 510, which may be disposed at locations remote to the tester device 202, and in some instances remote from one another. In one variant, the tester device 202, reservation server 506 and TMC server 510 are each located at different headend 150 locations within the content distribution network 101.

The reservation server 506 is configured to run at least a reservation service 508 thereon. The reservation service 508 manages reservation of the plurality of available CPE 106 for testing. In one embodiment, the reservation service 508 provides an interface by which a tester or network operator may select one or more CPE 106 for testing. The interface may incorporate a means for the operator to select day(s), time(s), and length of a test (e.g., in hours, days, weeks, months, etc.) that is to be run on the selected CPE 106. The interface may further enable the operator to select which test cases, which CPE, how many iterations, and/or whether to run in parallel (all CPEs tested concurrently) or serially (one CPE at a time). Additionally, when determining which CPE 106 to reserve, the tester or operator may review reservations of other testers or operators. For example, the operator may require use of several CPE 106 for three days; if one of the requested CPE 106 has been previously reserved for the third day of the operator's testing, the operator will not select the given CPE 106.

The TMC server 510 in one embodiment is configured to run a video capture service 406, an OCR and image comparison service 408, and a remote (e.g., IR) service 404 thereon. As discussed above with respect to FIG. 4, these services 404, 406, 408 provide an interface between the remote device 204, video capture entity 302, and OCR and image comparison entity 304, and the tester device 202. In one embodiment, each of these services 404, 406, 408 runs the .NET framework. The services 404, 406, 408 run in their own memory space of the TMC server 510. Alternatively, these may each be run on separate TMC computers (not shown). Providing these services as intermediaries between the execution engine 502 and remote device 204, the video capture device 302, and OCR and image comparison entity 304, provides a more mobile and distributed testing environment. As noted above, the tester device 502, TMC server 510 and reservation server 506 may be physically located at a different headend 150 (or other) location, thereby enabling testing across the network.

The present embodiment may further be configured to utilize a video capture card which may perform more video captures per second than that of previously described embodiments. The video capture card does not share hardware resources, and therefore avoids contention and other latency issues. Additionally, the video capture card of the present embodiment does not block a script from grabbing a frame while another script is grabbing a frame.

In one variant (not pictured), the Web Services discussed above may be utilized at the TMC server 510 to provide the operator/tester with the ability to access the TMC services (i.e., video capture service 406, remote device service 404, and OCR and image comparison service 408) via a web interface (not shown).

It is noted that, while certain ones of the FIGS. provided herein do not specifically illustrate the use of web services (for simplicity and clarity), such web services may be implemented with each of the embodiments discussed herein. The functions may be accessed via a web service call in all of the embodiments discussed herein (where web services is implemented).

In one exemplary architecture, the video capture device 302 and the remote device 204 are 16-port devices. The video capture may utilize DirectShow, as discussed previously; however a JNBridge may not necessarily be required because the web services architecture is used to communicate between the various entities.

The embodiment of FIG. 5 functions to cause one or more scripts 504 to be run across reserved ones of the CPE 106 by communicating to these devices using an remote device 204. In response to the commands received at the CPE 106 (in accordance with the script 504), a composite video signal is returned from the CPE 106 as well as SNMP (or other) messages which are transmitted to the tester device 202 for analysis by the tester or operator.

Figure 6:
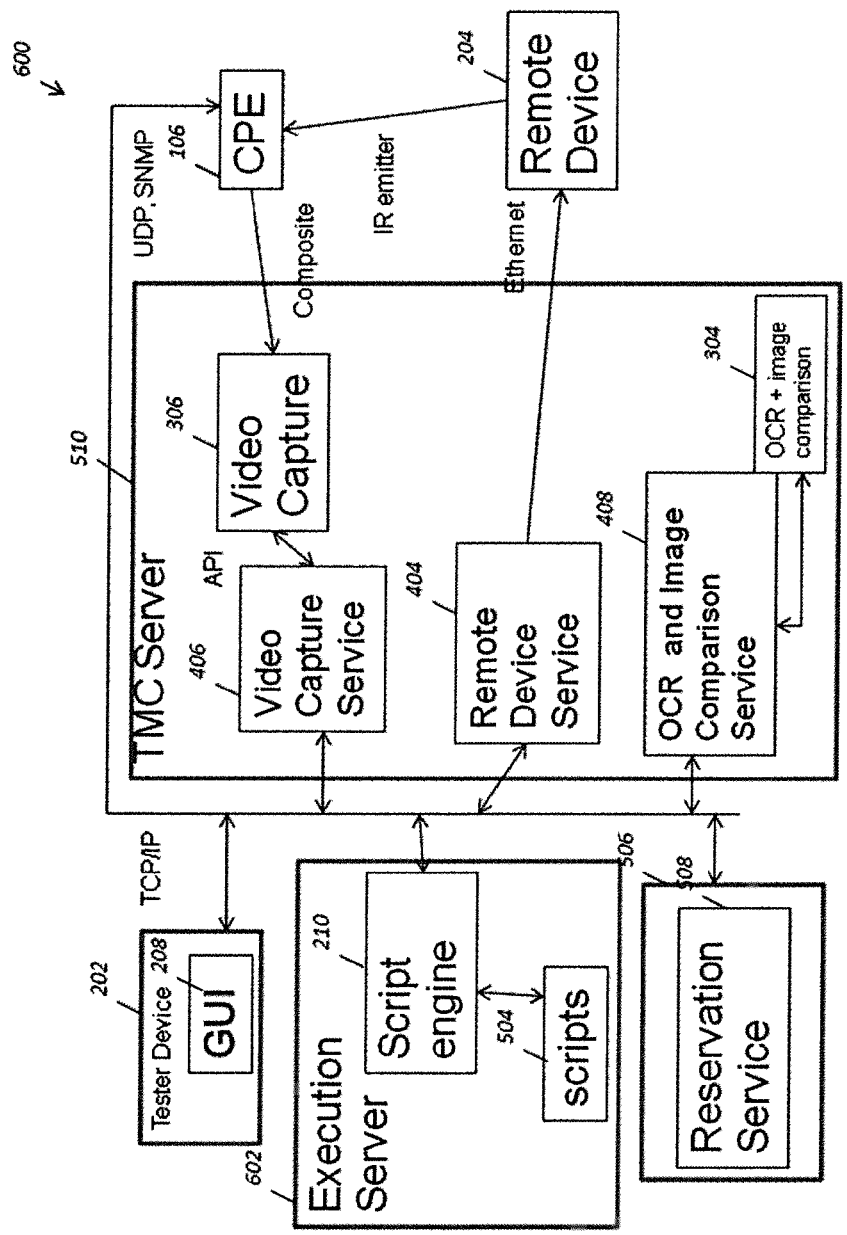
FIG. 6 is a functional block diagram illustrating a fifth embodiment of an exemplary automated device testing system for use with the present invention.

Referring now to FIG. 6, yet another testing architecture is illustrated. As shown in FIG. 6, various devices are used for implementing test functions including e.g., a tester device 202, an execution server 602, a reservation server 506, and a TMC server 510. The physical separation of the various entities in this embodiment provides an ability of the system to perform larger scale tests (i.e., run more scripts at once). All of the tests are run from a centralized location (e.g., the execution server 602), however the testing devices 202 which initiate the tests may be located at multiple distinct locations. Likewise, the CPE 106 on which the tests are run may be located at yet another location remote to the execution server 602, the testing device 202, and one another. In order to ensure smooth operation of the highly distributed testing system 600, the reservation server 506 running a reservation service thereon 508 is utilized.

In the embodiment of FIG. 6, the tester device 202 comprises a thinner device than that discussed previously (with respect to the embodiments of FIGS. 2-5). In particular, the tester device 202 of the present embodiment merely comprises a GUI 208 which enables the user of the device (a tester or operator) to access the other components. In one embodiment the GUI 208 is a web-based interface. Thus, the aforementioned Web Services (not shown) may be configured to run at the TMC server 510.

The execution server 602 is a scalable hardware platform that is configured to run hundreds of scripts simultaneously. As discussed previously with respect to the embodiment of FIG. 5, the scripts 504 which are run at the execution server 602 may comprise Java-based scripts (as discussed above with respect to FIG. 2, element 212) as well as non-programmer entered text file scripts such as Ruby-based DSL (as discussed above with respect to FIG. 3, element 306). Hence, the script engine 210 is, in one embodiment, configured to run a framework which enables text scripts to be translated into a language executable by the script engine 210.

In addition to the scripts running at the execution server 602, scripts may also simultaneously run on one or more devices physically connected to the CPE 106. Once again, the reservation service 508 is utilized to avoid contention for the available CPE 106 by the various devices requesting to run tests thereon.

Figure 6A:
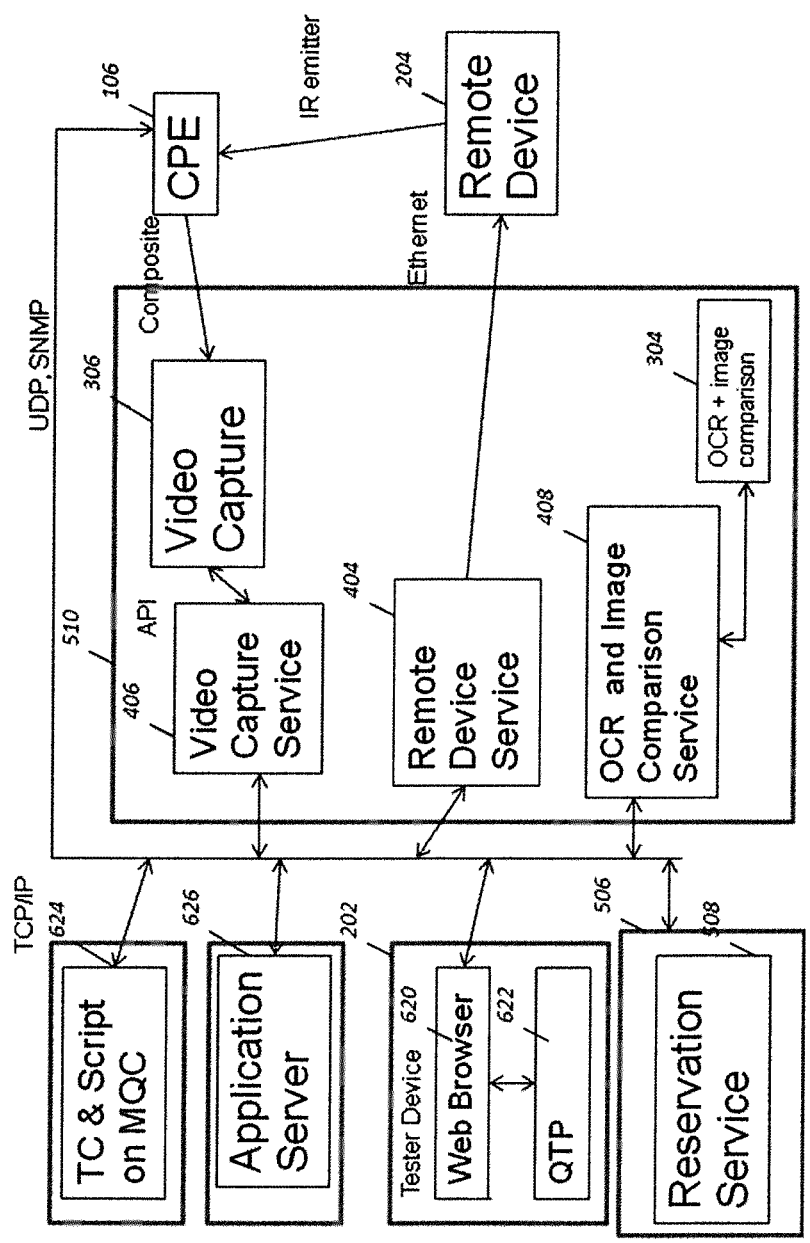
FIG. 6*a* is a functional block diagram illustrating one exemplary implementation of the exemplary automated device testing system of FIG. 6.

FIG. 6a illustrates one implementation of the exemplary automated device testing system of FIG. 6. As shown, the end-to-end testing in this implementation utilizes the aforementioned QTP software 622 run on a tester device 202. The QTP software 622 provides test automation in the embodiment of FIG. 6a via the web browser 620 of the tester device 202. In other words, the QTP enables a user to access and begin running a script (test) which is located at a remote test case and script device 624. In the illustrated embodiment the test case and script device 624 comprises a MQC (Mercury Quality Center a.k.a. HP Quality Center) command structure. The exemplary test case launches QTP, which executes a test script written in VBScript. The test script uses a web browser to interact with the Application server 626, and uses web services call to interact with TMC in order to perform OCR, image comparisons etc. In one embodiment, the test control and script device 624 is run from an execution server (not shown) of the type discussed above with respect to FIG. 6. It is via the QTP that a network operator may interface with the scripts to specify a test procedure, and manipulate the application under test on the CPE 106.

At a separate application server 626, various applications which require testing may therefore be installed. In this manner, an application, once developed (such as by a developer) can be placed on the server 626 to be tested by other network operators located at different locations within the network. The other operators (testers) can access the untested applications via the aforementioned web browser 620. As noted above, the tester uses OCR and image comparison coupled with video capture to verify or validate the proper working of an application on the devices under test (e.g., CPE 106). As is also discussed above, a reservation entity 506 may be utilized to ensure that the CPE 106 are available for testing to a plurality of distributed testers.

In an alternative embodiment, RFT and RQM (rather than QTP and MQC) may be utilized at the tester device 202.

Figure 6B:
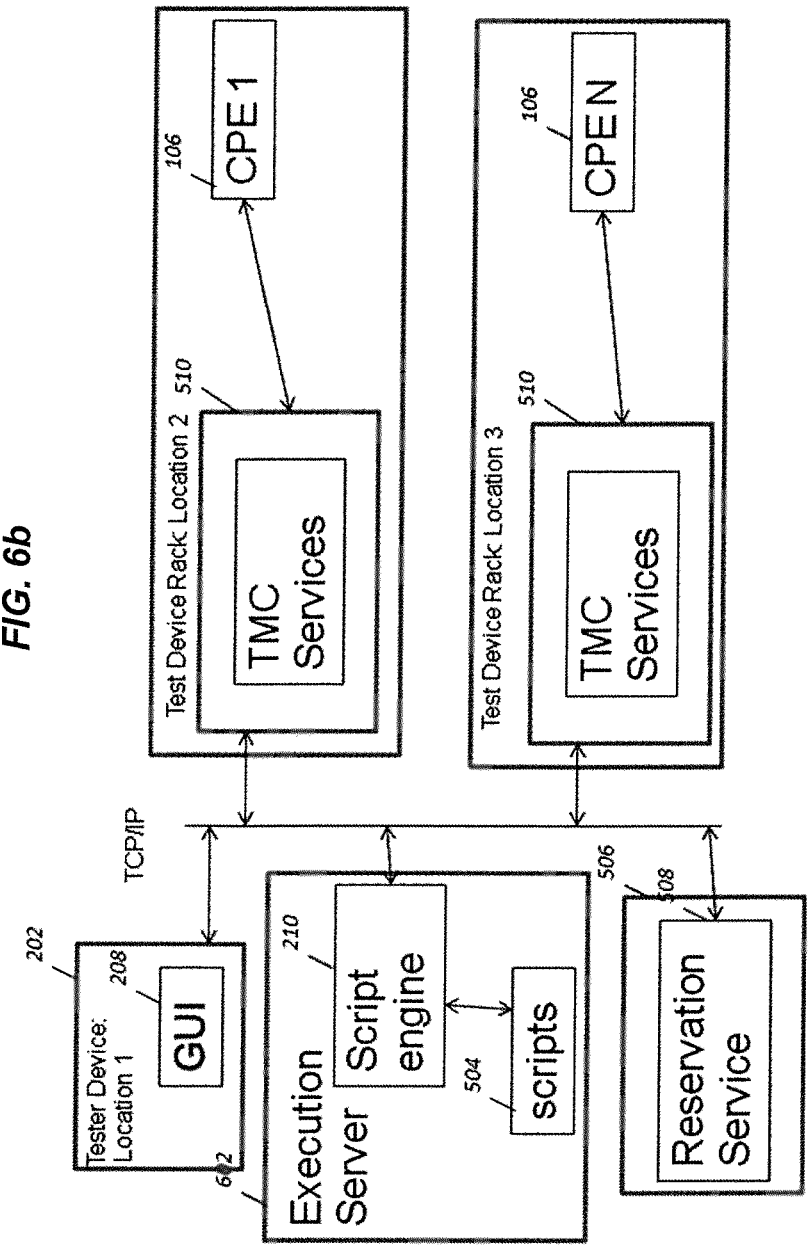
FIG. 6*b* is a functional block diagram illustrating a second exemplary implementation of the exemplary automated device testing system of FIG. 6.

FIG. 6b illustrates a detailed implementation of the exemplary automated device testing system of FIG. 6 for use in running tests on CPE 106 at various test rack locations. As shown, the system generally comprises a tester device 202, an execution server 602, and a reservation server 506. As discussed previously, the GUI 208 running on the tester device 202 (which may comprise a web-based GUI) is used to access both the reservation server 506 in order to reserve CPE 106 for testing, as well as to access the script engine 210 to cause one or more scripts 504 to be run.

Testing of the CPE 106 including validation and/or verification of actions take threat is effected via the use of a plurality of TMC services available via TMC servers 510 running at test device racks. In the illustrated embodiment, the test device racks on which the TMC servers 510 are each disposed at locations 2 and 3, respectively. It is further appreciated that more or fewer racks may be provided, the foregoing being merely exemplary of the broader concept.

Figure 6C:
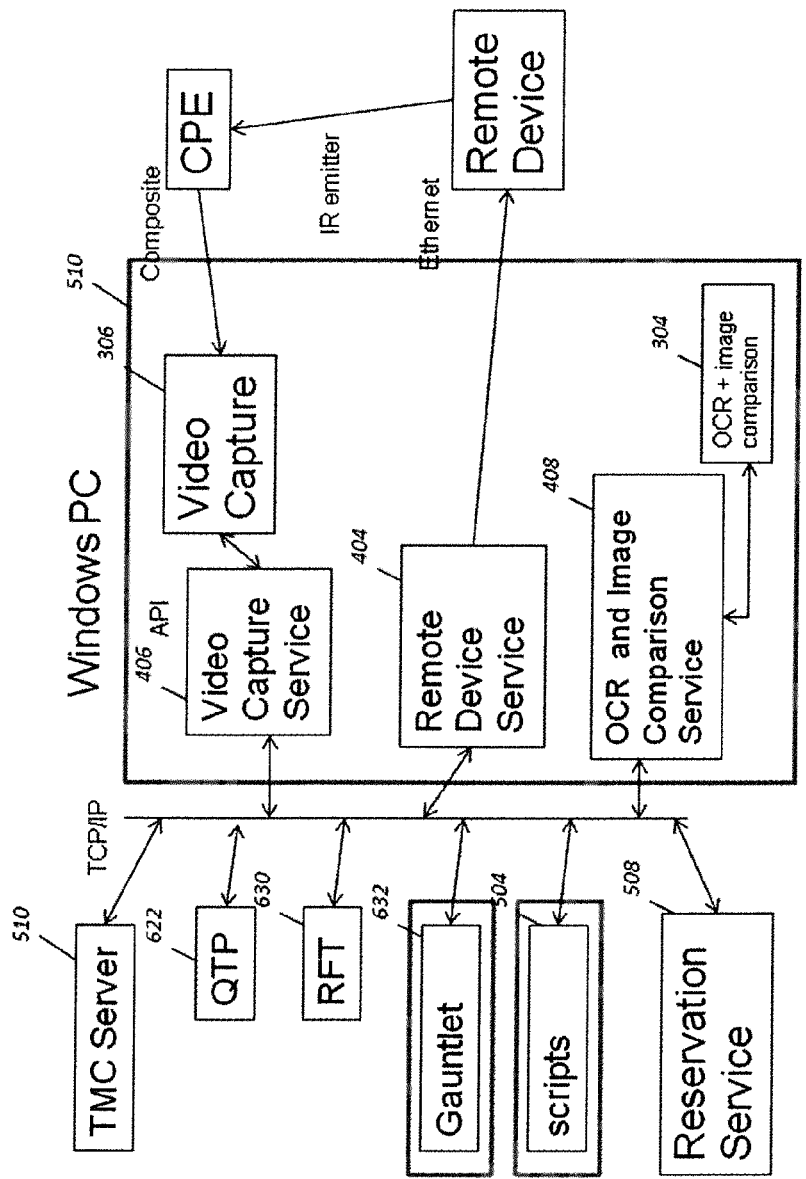
FIG. 6*c* is a functional block diagram illustrating yet another implementation of the exemplary automated device testing system of FIG. 6.

FIG. 6c illustrates a detailed implementation of the exemplary automated device testing system of FIG. 6 for use in permitting multiple testers (e.g., QTP tester 622 and RFT tester 630) to access and run tests on the CPE 106. The exemplary implementation of FIG. 6c illustrates that any front end may be used to run scripts 504. As shown, scripts 504 may be run from one or more of a remote TMC front end 510 (as discussed above), a front-end device running QTP software 622, a front-end device running RFT software 630, and/or a gauntlet 632 (i.e., a tool for measuring CPE performance). As disclosed in the previous embodiments, a reservation service 508 enables the various front ends to reserve dates/time to access the CPE 106 for testing. The embodiment of FIG. 6c illustrates the versatility of the present invention, in that inter alia it may be easily used by different applications via the web services interface.

Exemplary Methods—

Figure 7:
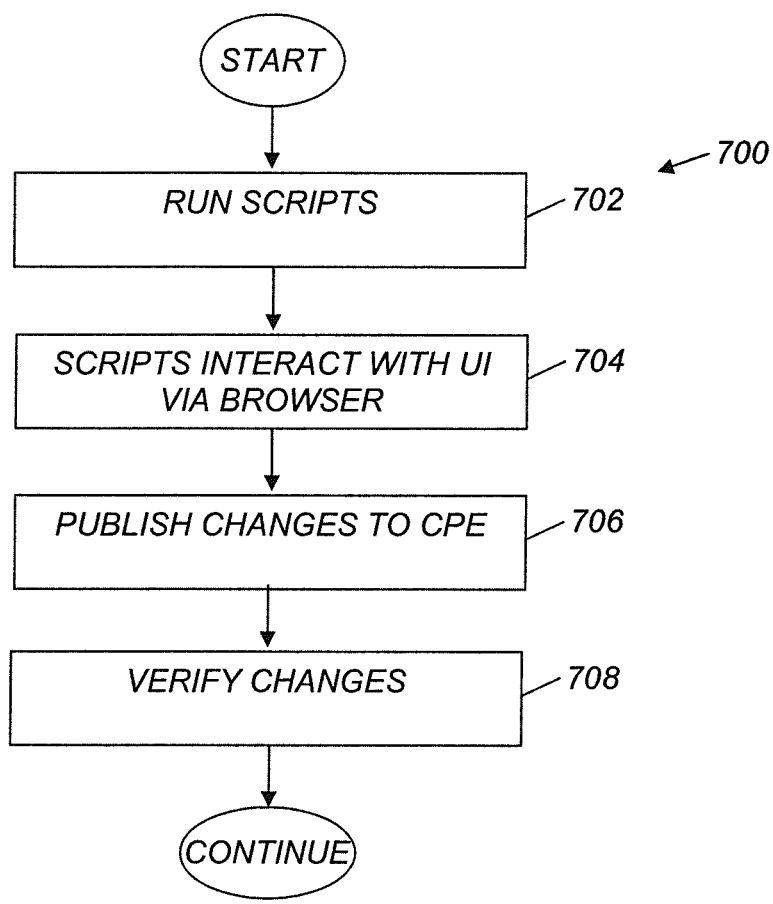
FIG. 7 is a logical flow diagram illustrating one embodiment of a method for automated testing of a plurality of devices.

Referring now to FIG. 7, an exemplary embodiment of a method for providing automated testing of a plurality of devices is described.

As shown, per step 702, one or more scripts are launched at a script engine. In one implementation, the script engine comprises a quality center running QTP software. The scripts indicate one or more steps to be taken at the CPE 106 and at an application server 626. Thus per step 704, the scripts interact with a user interface of the application server via a browser.

As discussed elsewhere herein, the application server stores one or more applications, developed by application developers, and requiring testing. Other network operators place these applications on the application server and the QTP scripts located at different locations within the network are used to test them. Hence, the QTP scripts access these applications so that they effect a change on the CPE which is then verified by using TMC web services.

In many instances, the applications for testing on the CPE involve one or more changes to the CPE, the EPG, or other changes reflected at the CPE display. At step 706, changes are published.

Next at step 708, the changes are verified via interaction with the CPE display. As discussed above, verification of changes occurs via the use of an remote device for navigating the CPE display and video capture, optical character recognition (OCR), and image comparison.

Figure 7A:
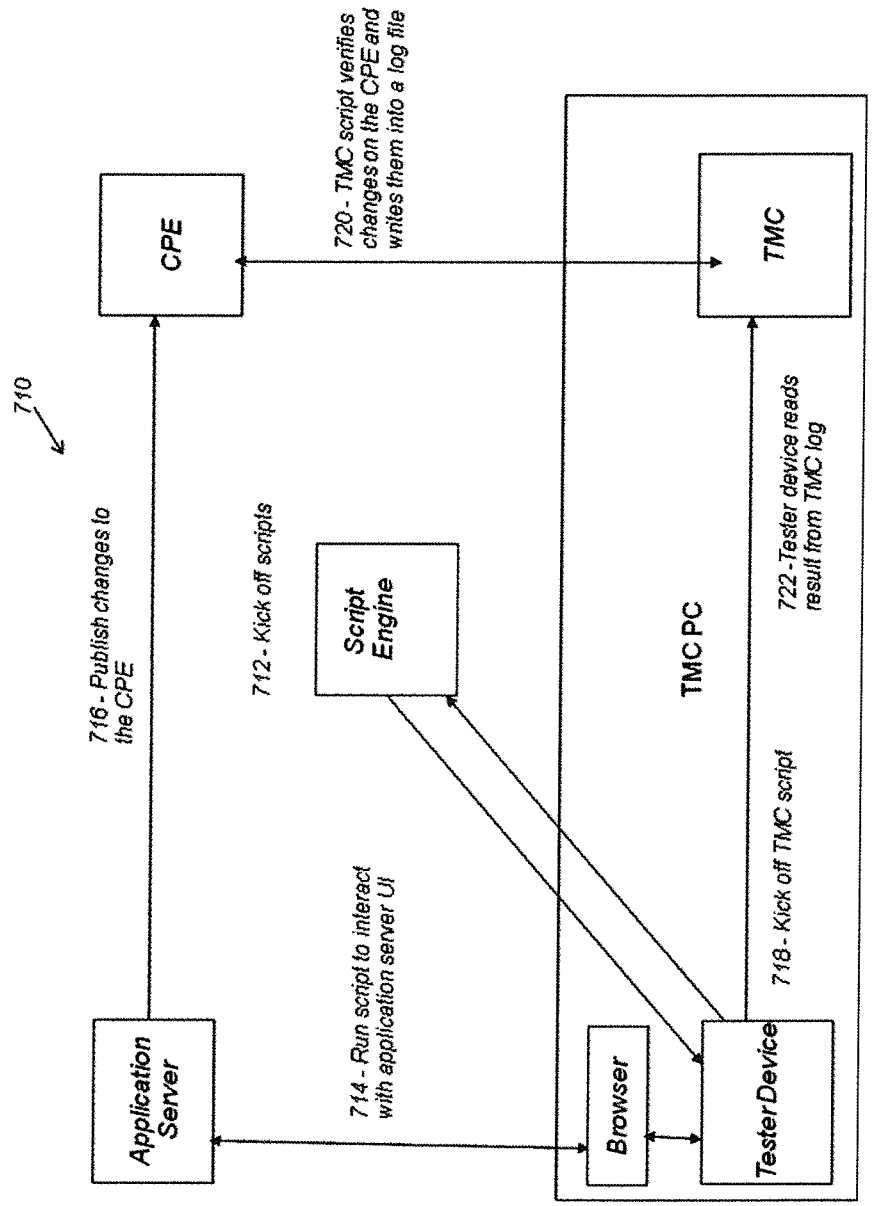
FIG. 7*a* is a logical flow diagram illustrating a detailed implementation of the exemplary method of FIG. 7.

FIG. 7a is a logical flow diagram illustrating one implementation 710 of the exemplary method of FIG. 7. As shown, per step 712, one or more scripts are run from either MQC or RQM at the tester device. In the illustrated embodiment, the tester device is run at a PC along with the previously discussed test measurement and control (TMC) entities and a web browser. The scripts are run so that they interact with an application server UI (per step 714). Changes made as a result of the script are at step 716 published to the CPE.

A TMC script to verify that the appropriate changes were made is then run (step 718). The TMC script verifies that the changes were made at the CPE (step 720) by interacting with one or more displays thereon. Information relating to the verification of the changes at the CPE are written to a log file, which is then read at the TMC entities (step 722).

Figure 7B:
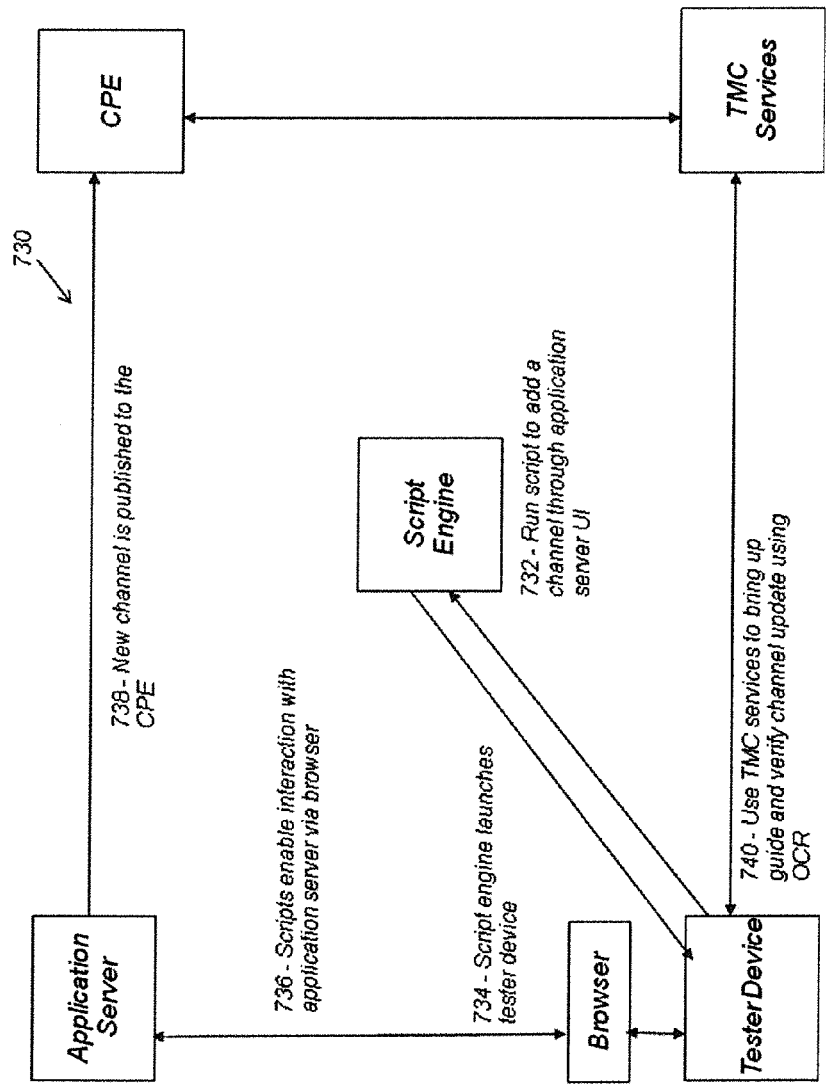
FIG. 7*b* is a logical flow diagram illustrating another detailed implementation of the exemplary method of FIG. 7.

FIG. 7b is a logical flow diagram illustrating another implementation of the exemplary method of FIG. 7. The method 730 of FIG. 7b specifically illustrates a process for adding a channel; however, it is appreciated that the herein disclosed apparatus and methods may be utilized for providing other functions and changes at the CPE as well.

As shown, per step 732, a script is run to add a channel through the application server UI. The script engine running the script launches the tester device at step 734. Then, per step 736, the scripts enable interaction with application server via a browser.

A new channel may then be published to the CPE at step 738 and verified at step 740. A key difference between the embodiment of FIGS. 7a and 7b is that in step 740, the script in the tester device is testing both the application server and the CPE from one place using the native calls to interact with the application server, and TMC web services calls to interact with the CPE. In contrast, steps 718 and 722 of FIG. 7a utilize a separate script that is launched, and the result is retrieved from a log. In this manner, end-to-end testing is made possible from one script, therefore making the overall system seamless.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A system configured to test a plurality of client premises devices (CPE), said plurality of CPE for use in a content delivery network, said system comprising: a first entity comprising at least a user interface configured to enable a user to implement one or more test scripts configured to alter at least one aspect of a function present on said plurality of CPE; a second entity comprising at least a processor apparatus configured to execute said one or more test scripts to run on said plurality of CPE; a remote device configured to simulate a remote control configured to control said plurality of CPE upon execution of said one or more test scripts; and a validation entity configured to enable said user to determine whether said alterations to said at least one aspect of said function present on said plurality of CPE were implemented.

2. The system of claim 1, wherein said first entity comprises a user's personal computer, and said user interface comprises a web browser.

3. The system of claim 1, wherein said remote device is further configured to navigate various interfaces displayed on said plurality of CPE.

4. The system of claim 3, wherein said validation entity is further configured to compare information received during said navigation of said various interfaces displayed on said plurality of CPE to reference information in order to generate a report of success of said one or more test scripts.

5. The system of claim 1, wherein said second entity comprises a server apparatus configured to store a plurality of test scripts provided by said first entity.

6. The system of claim 5, wherein said first entity is configured to access a reservation entity said reservation entity configured to enable said first entity to reserve one or more of said plurality of CPE for implementation of said one or more test scripts.

7. An apparatus configured to run one or more scripts configured to test a plurality of client devices within a content delivery network, said apparatus comprising:
at least one interface configured to communicate with a plurality of test devices associated with individual ones of a plurality of users;
a reservation service in communication with said plurality of test devices;
at least one server in communication with said plurality of client devices;
a storage element configured to store a plurality of test scripts thereon, said plurality of test scripts being developed by said individual ones of said plurality of users of said plurality of test devices, at least a first one and a second one of said plurality of test scripts configured to alter, via use of a computerized device configured to simulate a remote control, at least one aspect of a function of a first set and a second set of individual ones of said plurality of client devices, respectively; and
a processor apparatus, said processor apparatus being configured to cause said at least said first one and said second one of plurality of test scripts to be executed on said first set and said second set of said individual ones of said plurality of client devices, respectively;
wherein said communication with said reservation service comprises receipt of:
a first set of commands relating to selection of said at least said first one of said plurality of test scripts for execution on said first set of said individual ones of said plurality of client devices at a first unreserved date and time; and
a second set of commands relating to selection of said at least said second one of said plurality of test scripts for execution on said second set of said individual ones of said plurality of client devices at a second unreserved date and time;
wherein said remote control is configured to control said first set and said second set of said individual ones of said plurality of client devices based at least on said execution of at least said first one and said second one of said plurality of test scripts, respectively.

8. The apparatus of claim 7, wherein said communication with said plurality of test devices comprises receipt of one or more of said plurality of test scripts therefrom, and a command for execution of particular ones of said plurality of test scripts.

9. The apparatus of claim 7, wherein said at least one server comprises at least video capture, optical character recognition, and image comparison capabilities.

10. The apparatus of claim 9, wherein said communication with said at least one server comprises receipt of a plurality of information from said at least one server, said plurality of information configured to enable an evaluation of whether said alteration to said at least one aspect of said function of said first and second sets of individual ones of said plurality of client devices, respectively, were implemented.

11. The apparatus of claim 7, wherein said alteration of said at least one aspect on at least one of said one or more of said plurality of client devices is capable of validation via a simulation of a remote control configured to control said at least one of said plurality of client devices.

12. An apparatus configured to facilitate a test of a plurality of client devices associated with a content delivery network via a plurality of distributed test devices, said apparatus comprising:
    an engine configured to store and run a plurality of test scripts;
    at least one server in communication with said plurality of client devices;
    a storage element configured to store a plurality of information related to reserved dates and times for individual ones of said plurality of client devices, said reserved dates and times configured to indicate particular ones of said plurality of test scripts to be run on said particular ones of said plurality of client devices; and
    a processor apparatus, said processor apparatus being configured to enable individual ones of said plurality of test devices to reserve dates and times to test particular ones of said plurality of client devices, said processor apparatus configured to run at least one computer program thereon, said computer program comprising a plurality of instructions which are configured to, when executed, cause said apparatus to:
        allow a first user via a first one of said plurality of distributed test devices to review said reserved dates and times, and to select a first one of said plurality of test scripts for execution on a first set of individual ones of said plurality of client devices at a first unreserved date and time; and
        allow a second user via a second one of said plurality of distributed test devices to review said reserved dates and times, and to select a second one of said plurality of test scripts for execution on a second set of individual ones of said plurality of client devices at a second unreserved date and time;
    wherein said plurality of test scripts are utilized to cause an alteration, via a computerized device configured to simulate a remote control, of at least one aspect of a function of said plurality of client devices, said one or more test scripts comprise text file scripts within a framework run on each of said plurality of client devices, said remote control configured to control said first set and said second set of said individual ones of said plurality of client devices based at least on said execution of at least said first one and said second one of said plurality of test scripts, respectively.

13. The apparatus of claim 12, wherein said plurality of instructions are further configured to, when executed, cause said apparatus to notify said individual ones of said plurality of test devices when a requested date and time for reservation of said particular ones of said plurality of client devices is not available.

14. The apparatus of claim 12, wherein said alteration of said at least one aspect of said function of said plurality of client devices comprises implementation of a parental control on each of said plurality of client devices.

15. The apparatus of claim 12, wherein said alteration of said at least one aspect of said function of said plurality of client devices comprises addition of one or more new content items to respective playlists capable of being displayed, via use of respective electronic program guides (EPGs), on each of said plurality of client devices.

16. A method for enabling testing of a plurality of client devices adapted for use in a content delivery network, said method comprising:
    executing one or more test scripts to run on said plurality of client devices;
    causing at least one remote device to control said plurality of client devices upon said execution of said one or more test scripts via an infrared (IR) or radio frequency (RF) communication protocol;
    collecting a plurality of information upon said execution of said one or more test scripts relating to one or more alterations of said at least one aspect of a function present on said plurality of client devices; and
    determining based at least in part on said collected information whether said one or more alterations to said at least one aspect of said function present on said plurality of client devices have been implemented at said plurality of client devices;
    wherein said one or more test scripts are configured to cause said one or more alterations of said at least one aspect of said function present on said plurality of client devices, said function comprising at least digital video recording (DVR) functionality and said alteration comprising recordation of one or more respective content items on each of said plurality of client devices.

17. The method of claim 16, wherein said collecting of said plurality of information comprises utilizing at least video capture, optical character recognition, and image comparison.

18. The method of claim 16, wherein said one or more test scripts comprise one or more text file scripts in a framework.

19. The method of claim 16, wherein said executing said one or more test scripts to run on said plurality of client devices comprises executing said one or more test scripts at a pre-reserved date and/or time on pre-determined ones of said plurality of client devices.

20. The method of claim 16, wherein said plurality of client devices are disposed at one or more user premises within said content delivery network.

21. The method of claim 16, further comprising accessing a reservation entity configured to receive:
    a selection from a first user of at least a first one of said one or more test scripts for execution on a first set of individual ones of said plurality of client devices at a first unreserved date and time; and
    a selection from a second user of at least a second one of said one or more test scripts for execution on a second set of individual ones of said plurality of client devices at a second unreserved date and time.

22. The method of claim 21, wherein said act of collecting said plurality of information further comprises enabling said first and second users to evaluate whether said alterations to said at least one aspect of said function present on said first and second sets of individual ones of said plurality of client devices, respectively, were implemented.

* * * * *